Oct. 14, 1969　　R. P. LANDGRAF ET AL　　3,473,058
SELF-STARTING SYNCHRONOUS MOTOR
Filed Jan. 23, 1967　　　　　　　　　　3 Sheets-Sheet 1
FIG_1
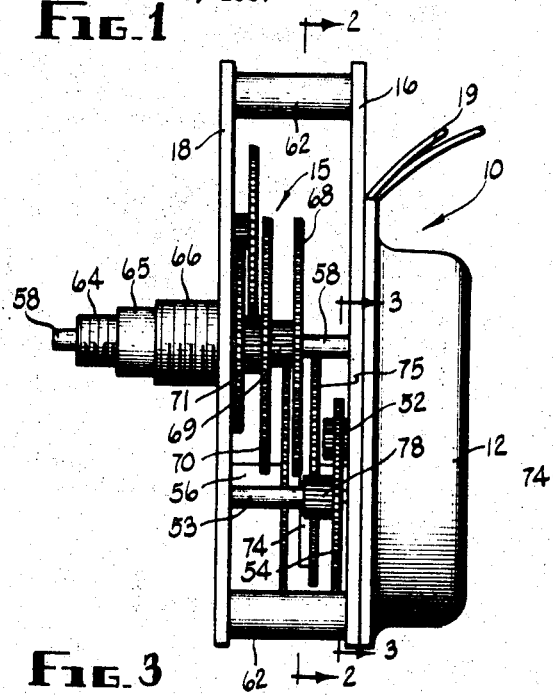
FIG_2
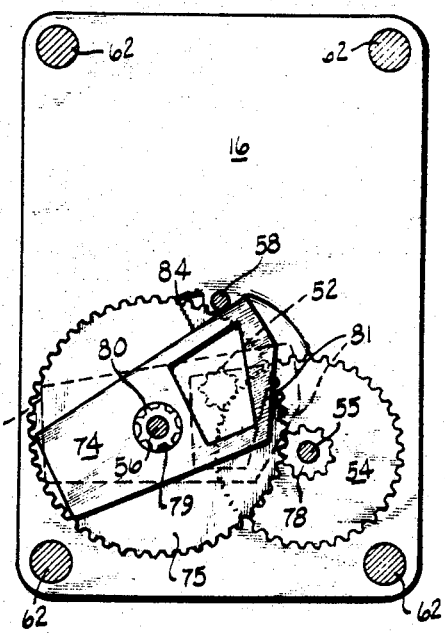
FIG_3
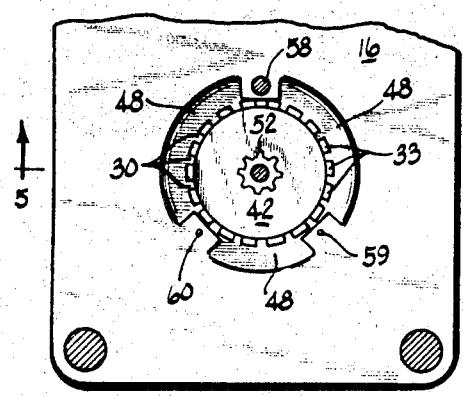
FIG_4
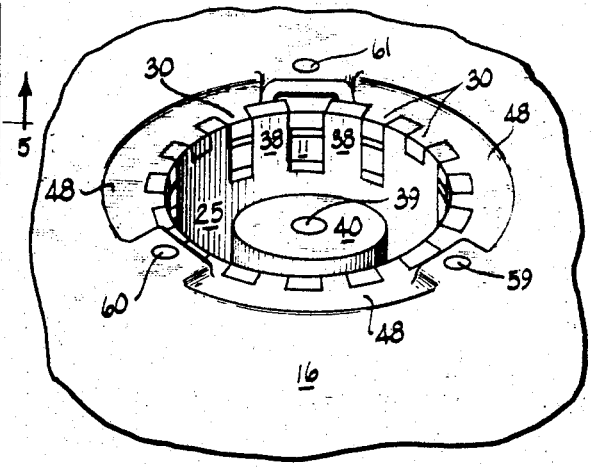
FIG_5
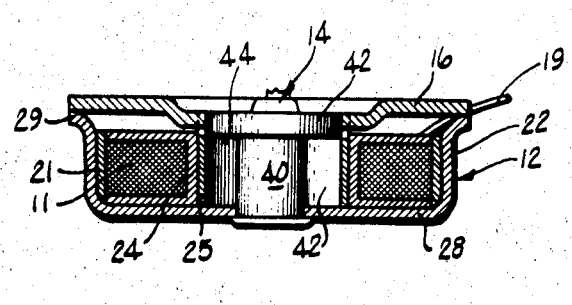
INVENTORS
RICHARD P. LANDGRAF
ROBERT S. LANDGRAF
BY Anderson, Luedeka, Fitch, Even & Tabin ATTYS.

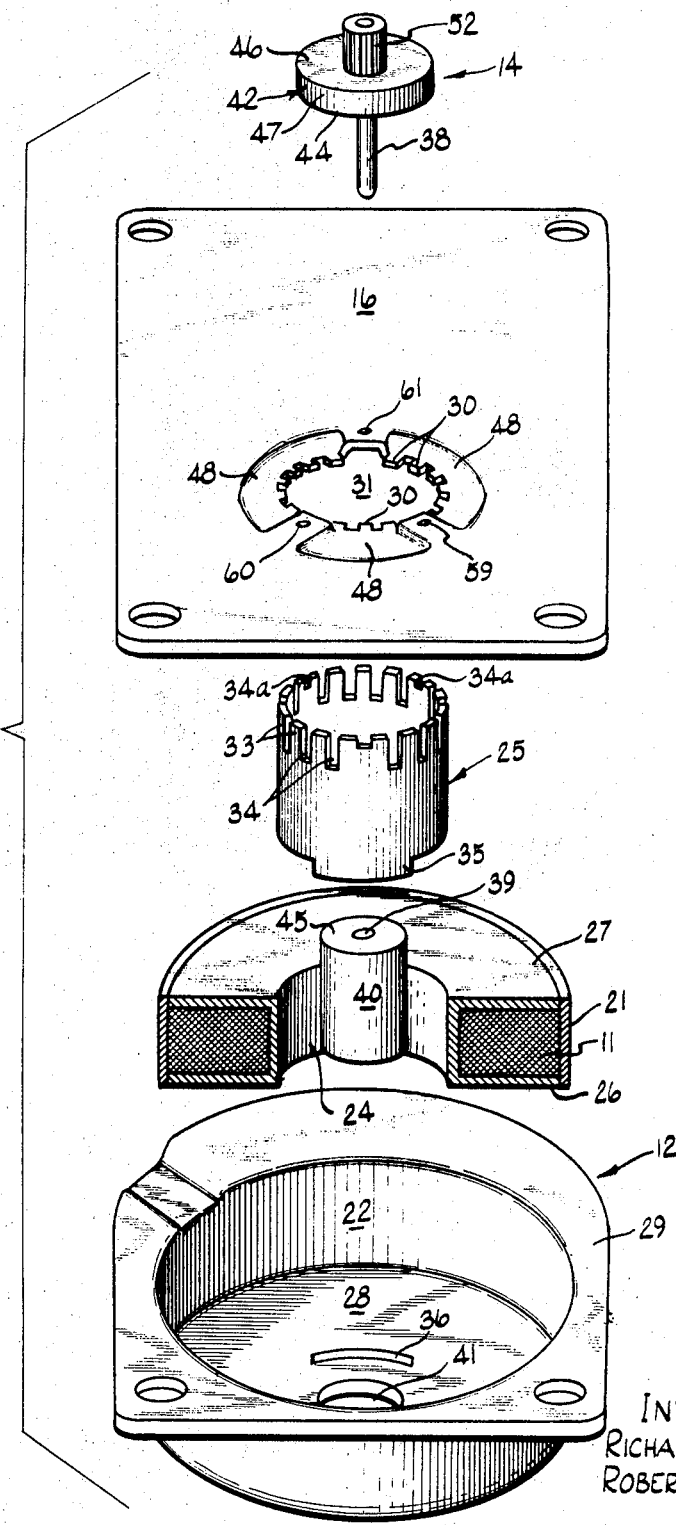

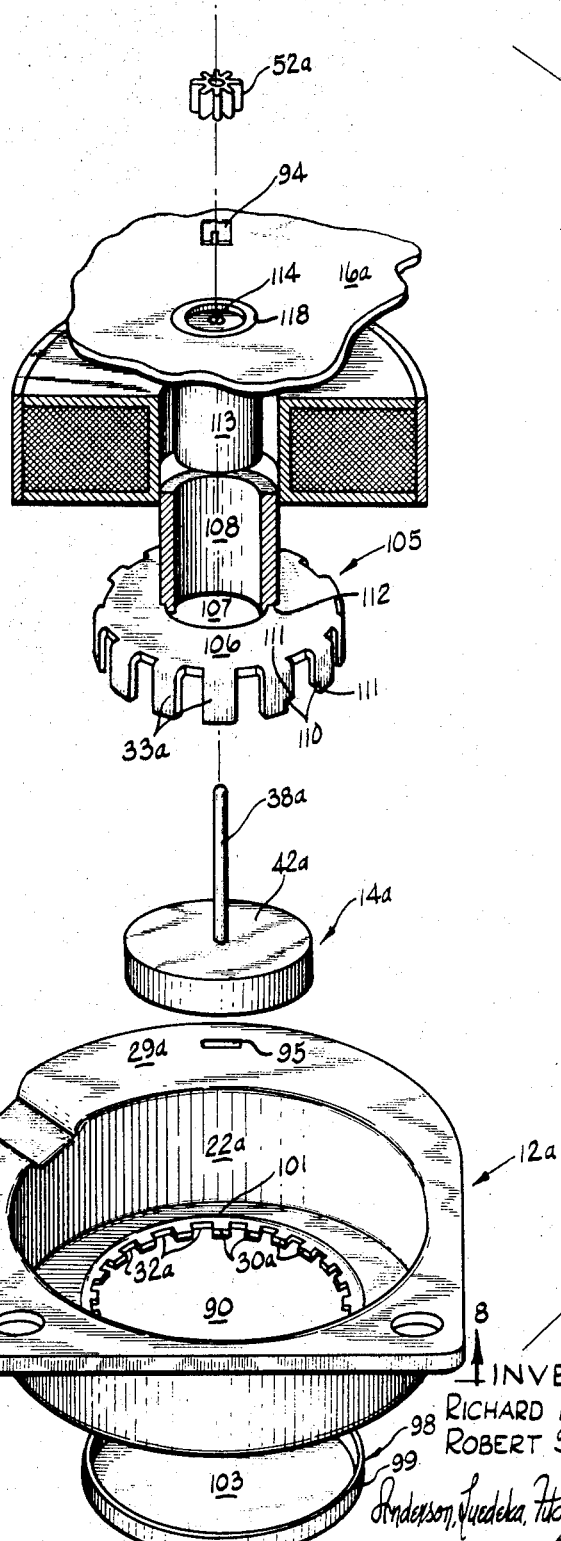

United States Patent Office 3,473,058
Patented Oct. 14, 1969

3,473,058
SELF-STARTING SYNCHRONOUS MOTOR
Richard P. Landgraf and Robert S. Landgraf, Chicago, Ill., assignors to Richard P. Landgraf and Robert S. Landgraf, both of Chicago, Ill., in joint-tenancy with right of survivorship
Filed Jan. 23, 1967, Ser. No. 610,926
Int. Cl. H02k 7/10
U.S. Cl. 310—41                                      21 Claims

ABSTRACT OF THE DISCLOSURE

A self-starting, synchronous motor for use in clocks, timers and control devices with a set of inner and outer field poles which are interleaved with and in contacting engagement with one another to align the poles and to eliminate the difficulty of making uniform gaps between the sets of poles. A permanent magnet rotor may be inserted at least partially within the flux producing coil to reduce the overall depth of the motor. To assure the motor runs in a predetermined direction, an obstructor is moved by the gear train to a blocking position in which the obstructor is in engagement with the periphery of the teeth of a gear to block rotation of the motor in the reverse direction.

---

This invention relates to synchronous motors and more particularly to self-starting synchronous motors for use in clocks, timers, control devices or the like.

The present invention is particularly directed to relatively small synchronous motors having a permanent magnet rotor and a field structure including inner and outer sets of field poles with the individual poles at the respective sets alternating with each other and disposed circumferentially around the rotor. A flux inducing field coil causes the poles of the sets to be of opposite polarity at any given instant, and the poles change polarity as the A.C. current supplied to the coil changes phase.

Motors of the foregoing type are produced to sell at relatively low price and on a relatively large scale so that reductions in cost of assembly or cost of parts results in significant commercial savings. In addition to cost, another important consideration is that such motors run at a relatively constant speed to assure no gain or loss over a considerable running period. Also, the motors run for considerable lengths of time while receiving little or no maintenance. Size is also an important consideration and a reduction in size for many installations assures that the motor will fit into an instrument or a receptacle, for instance, a socket in a wall.

A general object of the invention is to provide an improved motor of the above described character which satisfies the considerations of low cost, accuracy, small size and long life.

Heretofore, considerable expense in construction and a number of elements have been employed in synchronous self-starting motors to accurately locate one set of field poles relative to the other set of field poles to assure that adjacent poles are separated by uniform air gaps. In accordance with a further object of the invention, the sets of field poles are interlocked with each other in a positive manner to accurately align the adjacent poles relative to each other. Another object of the invention is to align inner and outer sets of poles and disposing them in frictional engagement with one another. A related and further object is a simplified construction of a field for a motor, of the foregoing kind, from which has been eliminated the usual gaps between adjacent poles along with the shunting washers, inserts, core plugs or the like employed in the prior art to establish these uniform air gaps between adjacent poles in a circumferential series of poles.

Another object of the invention is to simplify construction and assembly of a motor having the foregoing characteristics by affording a plurality of locating surfaces on a main mounting plate for locating an inner field plate and a gear train mechanism adapted to be driven by the rotor of the motor. A related and more specific object of the invention is to provide the main plate with a series of projections spaced circumferentially about and extending radially toward a rotor to constitute a set of outer field poles for locating an inner set of field poles by interlocking with the latter. A further object of the invention is to accurately position the magnetic field in relation to a permanent magnet rotor by a novel mounting plate having projections for one set of pole pieces interlocked with another set of field poles on sleeve staked to a coil carrying housin.

Another object of the invention is to provide motors of the foregoing kind which are reduced in size in a novel manner to assure that the motor is capable of fitting into a conventional wall socket for receiving clock motors. A more specific object of the invention is to reduce the depth of the motor by inserting the permanent magnet rotor within a central bore of the flux including coil. Thus, the overall depth of the motor is reduced from the depth of those motors of the prior art in which the rotor is disposed axially outward of the central bore of the field including coil. A further object of the invention is to provide a self-starting synchronous motor construction in which the interlocking outer field pole projections may be formed either in the mounting plate or, for larger torque applications, in the coil housing.

Self-starting motors which have a permanent magnet rotor and a circular array of poles of alternating polarity disposed about the rotor are likely to start running in either direction. Heretofore, when the motor begins to turn in the reverse direction, relatively complicated loss motion mechanisms, dogs or the like have been employed to cause the motor to change its direction of rotation to the forward direction, which for a clock, would be to cause the hands of the clock to move forwardly in the clockwise direction. Accordingly, another object of the invention is to provide a simple and quick acting obstruction for preventing all but a very small movement in the reverse direction prior to causing the motor to move in the forward direction. Another and related object of the invention is to afford a novel obstructor which is quickly moved by the gear train turning in the reverse direction to a blocking position against the outer peripheral surface of teeth of a gear and which is moved by the gear train turning in the forward direction to an idle position adjacent the periphery of the teeth of the blocking gear. These motors are often mounted in different positions with the rotor disposed at various inclinations to the vertical and a further object of the invention is to counterbalance the obstructor and to sandwich the same between gears of the gear mechanism to insure proper operation of the obstructor irrespective of the orientation of the motor.

Other objects and advantages will be apparent from the following description taken in connection with the accompanying drawings in which:

FIGURE 1 is a side elevational view of a motor and gear mechanism embodying the novel features of the present invention;

FIGURE 2 is a sectional view taken substantially along the lines 2—2 of FIGURE 1;

FIGURE 3 is a fragmentary sectional view taken along the lines 3—3 of FIGURE 1;

FIGURE 4 is a fragmentary, enlarged perspective view of the interlocking field poles;

FIGURE 5 is a sectional view taken along the lines 5—5 of FIGURE 3;

FIGURE 6 is an exploded view showing the relationships of various elements of the motor embodying the novel features of the present invention;

FIGURE 7 is an exploded view of another embodiment of the invention showing the relationships of various elements of the motor; and FIGURE 8 is a reduced in size view of the housing taken along the line 8—8 of FIGURE 7 from the bottom.

As shown in the drawings for purposes of illustration, the invention is embodied in a motor and attached gear mechanism 10 of the kind suitable for use in driving controlled devices such as timers on clocks. Generally, the motor includes an annular flux inducing coil 11 (FIGURE 5) disposed in a housing 12 for generating a magnetic field which causes rotation of a permanent magnet disc shaped rotor 14 which, in turn, drives a series of meshed gears 15 (FIGURE 1) mounted on shafts extending horizontally between vertically spaced plates 16 and 18. To induce the flux for impelling the rotor, the coil is connected by leads 18 to a suitable source of alternating current of 60 cycles.

The coil 11 is annular in shape and is nested in the housing 12 which is generally dish-shaped with a central cavity having an outer circumferential wall 22 (FIGURE 5) disposed to encircle the outer circumferential wall 21 of the coil 11. An inner circumferential wall 24 defining a central bore of the coil fits snugly about a sleeve 25 extending through the center of the coil. The sleeve is formed of a ferromagnetic material such as soft steel and constitutes an inner field plate. A lower radial wall 26 of the coil (FIGURE 5) rests against a bottom end wall 28 of the dish-shaped housing and an opposite upper radial wall of the coil 27 is disposed slightly beneath a radially and outwardly extending circumferential flange 29 of the housing 12. The flange 27 is formed integrally with the housing at the upper edge of its ring wall 22. The flange 29 is fixed by fasteners not shown to the back side of the mounting plate 16. Herein, the housing is formed by die punching a ferromagnetic material such as soft steel and serves as part of the outer stator field.

In accordance with the present invention, a set of outer field poles are formed by circumferentially spaced projections 30 (FIG. 4) on the mounting plate 16. The projections 30 are disposed about an aperture 31 in the plate and are herein formed by punching radial slots 32 in the plate about the rim of the aperture. The projections 30 are interlocked with a set of inner field poles 33 formed by circumferentially spaced projections on the upper rim (FIG. 4) of the sleeve 25, the projections being formed by punching spaces or slots 34 in the upper end of the sleeve 25. The circumferential width of each slot 34 is sized to accept a projection 30 with a snug, friction fit at the interface of the radial walls of the adjacent projections on the plate 16 and sleeve 25 respectively. The radial depth of the radial slots 32 is equal to the thickness of the sleeve 25 so that a smooth inner wall is formed at the upper end of the base of the sleeve when the projections 30 are in the slots 34.

By the above construction of poles, instead of affording the usual air gap between the inner and outer sets of field poles and trying to obtain and to maintain a uniform air gap between the poles, the sets of the poles of the present invention are aligned by being interleaved and in direct engagement with each other. This contact between adjacent poles of the respective sets results in a shunting of a portion of the flux induced between the poles which are of opposite polarity. With the projections at right angles and the usual tolerances allowing spaced points of contact only, the flux is not completely short circuited but only partially shunted. This partial shunting of the flux has been found to reduce the fringe flux field and to reduce the amount of torque generated. The latter advantageously eliminates the tendency of the rotor 14 to oscillate which condition is encountered in slow speed, (large number of poles) synchronous motors having a small diameter rotor. Also, the partial shunting of the flux reduces stray fields which often cause vibration of nearby shafts in their bearings.

As shown in FIGURE 5, the slots 34 in the sleeve 25 extend down from the upper edge of the top rim of the sleeve 25 past the plane of the top radial wall 27 of the coil. For a purpose hereinafter set forth, three slots 34a (FIG. 6) are shorter than the remaining slots 34 in that they do not extend down as far as the slots 34. The end of the sleeves 25 opposite the projections is formed with arcuate lugs 35 (FIG. 6) which are inserted into arcuate slots 36 formed in the bottom wall 28 in the housing. The lugs align the lower end of the sleeve in the housing and the sleeve is retained in position by the projection 30 on the plate 16 bearing against the short slots 34a.

To align the longitudinal axis of the rotor 14 with the axis of the sleeve 25, a supporting shaft 38 (FIG. 6) for the rotor is journaled in a bore 39 extending along the longitudinal axis of a cylindrically shaped bearing 40. The latter is disposed within the sleeve 25 and is fastened to the bottom wall 28 of the housing 12 at its lower end which extends into an aperture 41 in the bottom wall and is staked thereto. The arcuate slots 36 and the aperture 41 are formed by the same die and hence they are coaxial with one another and hold the sleeve and bearing coaxial with each other.

To protect the bearing lubricant from being heated and deleteriously affected by a temperature rise, the outer, cylindrical wall of the bearing 40 is separated by a large annular air space 42 from the interior circumferential wall of the sleeve 25. Clock motors generate considerable heat during their prolonged periods of operation, and this air space allows cooling of the bearing thereby preventing the heating of the lubricant to a temperature which would adversely effect the lubricant and give rise to maintenance problems or undue wear.

According to another important aspect of the invention the depth of the motor from the bottom wall 28 of the housing 12 to the mounting plate 16 is reduced by disposing the rotor 14 within the bore of the coil 11. Heretofore, the usual practice is to space the rotor axially outside of the bore in the coil. By reducing the depth of the motor of the present invention, the motor is more compact, fits easily within wall receptacles provided in the walls of office buildings and the like to receive clock motors. To these ends, the lower radial wall 44 of the rotor is disposed beneath the plane of the upper surface 27 of the coil 11 (FIG. 5) and rests on the upper end 45 of the bearing 40. The upper radial wall 46 of the rotor is disposed substantially flush with the top surfaces of the sets of inner pole projections 33, as seen in FIGURE 5, and the upper surfaces of the outer field poles 30 which also are in this same plane. A small annular air space exists in the radial direction between a circumferential wall 47 on the rotor and the adjacent sides of the projections 30 and 32. The overall depth of the motor is further reduced because the mounting plate 16 is dished down and about the aperture 31 and forms three arcuate segments 48 about the aperture 31 on which are formed the pole projections 30.

The rotor 14 is formed in the shape of a disc by molding an elastomeric material containing permanent magnet type ferromagnetic particles. The disc is then magnetized to provide a plurality of poles around the circumference of the disc.

To drive the gear reducing mechanism 15, a pinion 52 is fastened to the end of the rotor shaft 38 projecting above the aperture 31 in the mounting plate 15. The teeth of the pinion which extend axially of the shaft are meshed with the teeth of a gear 54 made of rubber or the like to reduce noise and vibrations. Alignment of the gear teeth of the gear train is accomplished by journaling ends of three gear carrying shafts 55, 56 and 58 (FIG. 1) in holes 59, 60 and 61, respectively formed in the mounting plate 16 at accurately located positions relative to the center of the aperture 31 in the mounting plate. Preferably, the holes 59 constitute locating surfaces formed by a die forming the projection poles 30 on the flat, sheet metal mounting plate. The ends of the gear shafts which are inserted into the holes 59, 60 and 61, have reduced diameters to afford trunnions for rotatably mounting the shafts on the mounting plate 16. In a like manner, the other ends of the shafts 55 and 56 are formed with identical trunnions fitted in apertures in the plate 18 which is spaced from and held parallel to the mounting plate by four corner posts 62.

The shaft 58 is not journaled in the manner of the other shafts as it is an output shaft for driving a clock second hand which may be attached to its outer free end. Sleeves 64 and 65 are disposed coaxially with the shaft 58 and their outer free ends may be attached to minute and hour hands, respectively for a clock. The shaft 58 and the sleeves 64 and 65 extend through an aperture in the plate 18 and through a bore of an externally threaded sleeve 66 fixed on the outer side of the latter. The shaft 58 is journaled at its outer end in the bore of the sleeve 64 and a gear 68 and a pinion 69 are fixed to the shaft 58. The inner end of the sleeve 64 is fixed to a gear 70 and a pinion 71 and its outer end is externally threaded for connection to a minute hand. This sleeve is journaled in the bore of the larger sleeve 65 which in turn, is journaled in the bore of the non-rotatable sleeve 66. All of the sleeves are coaxial with the shaft 58. The gear train 15 has its intermediate gears suitably sized and arranged to drive the respective clock hands at the synchronous speeds as the rotor turns.

An important aspect of the present invention is that the output shaft 38 and the output sleeves 64 and 65 are driven in the forward direction, which is clockwise rotation for clocks rather than being driven in the counterclockwise direction. Permanent magnet synchronous motors are likely to start in either direction of rotation and in accordance with the present invention a simple obstructor 74 (FIG. 2) is provided to prevent rotation of the shafts in the counter-clockwise direction after which the oscillation of the blocked rotor will result in a reversal of the direction of rotation of the rotor and cause the shaft 58 to rotate in the clockwise direction.

Herein, the obstructor 74 is in the form of a thin plate, made of a stiff lightweight material such as fibre board, disposed in the space between a gear 75 fixed to the shaft 55 and the gear 68 fixed to the shaft 58. These gears are spaced apart axially by a distance slightly greater than the thickness of the obstructor 74 so that the obstructor is held against axial shifting and remains aligned for blocking engagement with a pinion 78 fixed to the shaft 55. The obstructor has a central opening 79 (FIG. 2) which is sized to fit about the periphery of the gear teeth on a pinion 80 fixed to the gear shaft 56. When the pinion 80 is rotated, its teeth exert a frictional driving force on the lightweight obstructor to turn the same in the direction of rotation of the pinion. When the motor is so oriented that the output shaft is vertical, then the obstructor will be resting on one of the gears 75 or 68 and a slight frictional torque exists between the obstructor and the gear at their interface to assist in turning the obstructor in the direction in which the pinion 80 is rotating.

To block rotational movement of the pinion 78 and the rotor pinion 52 in the "wrong" direction, the obstructor 74 moves from the idle position shown in solid lines in FIGURE 2 to bring a slanted edge 81 on the obstructor against the outer peripheral surface of the gear teeth on the pinion 78. As seen in FIGURE 2, a clockwise rotation of the pinion 80 swings the obstructor clockwise about the shaft 56 to bring its outer edge 81 against the teeth of the pinion 78, which is rotating in the "wrong" direction, i.e., counter-clockwise in FIGURE 2. The pinion teeth of the pinion 78 also attempt to rotate the obstructor in a clockwise direction whereby the points of increasing radii of the edge 81 begin to wedge against the surface of the pinion teeth, and in this blocking position, block rotation of the pinion 78. After the wedging overcomes the torque being provided by the rotor pinion 52, the rotor begins to reverse its direction of rotation and turn the rotor pinion in the proper direction whereby the gear 54 and its pinion 78 start to rotate the shaft 55 in a clockwise direction. Simultaneously, the pinion shaft 56 will start to rotate in the counter-clockwise direction to swing the obstructor to an idle position in which its longer side 84 engages the output shaft 58, the latter serving as a stop.

As seen in FIGURE 2, the effective and engaging portion of the slanted edge 81 of the obstructor is adjacent to but spaced from the rotating gear teeth on the pinion 78 when the obstructor is in its idle position. Thus, little turning movement is required to bring the obstructor from the idle position to the blocking position thereby resulting in an obstructor which is fast acting. Because the obstructor is fast acting, the hands of the clock will experience little or no reverse movement before the motor begins operation in the correct direction.

The Bakelite obstructor is very light weight and exerts little friction drag on the pinion 56 during the operation of the gear mechanism which might cause problems of accuracy of operation. Herein, the obstructor is mounted on the pinion 56 rather than on the pinion 78 so as to reduce the direct frictional drag on the rotor pinion 52 and this results in smoother and more accurate revolutions per minute of the rotor pinion 52.

The obstructor 74 is counterbalanced to assure that the obstructor moves easily and quickly between its idle and blocking positions irrespective of its disposition in a horizontal or vertical plane or at an angle to one of these planes. The counterbalancing is achieved herein by a large window or cutout 83 formed on the longer and wider portion of the obstructor to offset a weight which would otherwise be greater than the weight of the diametrically opposite portion of the obstructor. Thus, it will be seen that the obstructor is quick acting and requires little movement between an idle and blocking position as contrasted to prior art device having dogs or pawls which must move through greater distances to insert a tooth or point into the space between teeth rather than merely bearing against the outer edges of the teeth of the gear, as described herein.

A further embodiment of the invention is described in conjunction with FIGURES 7 and 8 and the same reference characters with a suffix *a* have been employed, whenever possible, to indicate the same or substantially the same elements as described hereinbefore. In the above described embodiment of the invention, the rotor disc 42 is disposed in the aperture 31 in the base plate whereas in this further embodiment the rotor disc 42a is disposed in a large aperture 90 in the bottom wall 89 of the cover 12a. The motor of this embodiment is particularly designed to generate more torque than the motor of the above embodiment and to this end the rotor disc 42a is larger than the disc 42 of the other motor.

In this instance, radially outward flange 29a on the housing 12a is abutted against the mounting plate 16a and is fastened to the latter by fasteners (not shown), and a locating lug 94 on the mounting plate 16a of rectangular cross sections projects into a rectangular locating aperture 95 in the housing flange 29a to angularly locate the housing relative to the mounting plate. An integral axial wall 22a on the housing 12a encircles the coil 11a and extends axially to the radial wall 89 having a central aperture 90 in which is formed the radially extending pole projections 30a. The aperture 90 is larger in size than the aperture 31 of the other embodiment to receive the larger armature disc affording the increased torque. To cover the rotor disc and the projection 30a, a circular cover 98 with an inturned annular rim 99 is press fitted into engagement with an inward, axial extending wall 100 on the housing to abut its end wall against a ring wall 101 on the housing wall 89. The depth of the cover rim 99 is such that when it is fully pressed into the housing, its radial wall 103 is flush with the outer exterior of the housing 12a and the rotor 14a is covered without increasing the axial depth of the motor.

In this embodiment of the invention, the inner field poles or projections 33a are provided on the outer rim of an inverted cup-shaped member 105 having a radial wall 106 with a central aperture 107 into which is projected an end of a cylindrical sleeve 108, which is a part of the inner field pole means. At the peripheral edge of the radial wall 106, the inner poles 33a are formed by the series of axially extending and circumferentially spaced projections 33a which are of a size and a shape to fit into the slots 32a between adjacent outer pole projections 30a.

To limit the axial extent of movement of the inner projection 33a into the spaces 32a between the outer pole projections 30a, small rectangular notches 110 are formed in the outer corners of several of the projections 33a to provide transverse shoulders or stop surfaces 111 to abut the upper sides of a pair of adjacent pole projections 30a. Thus, when the projections 33a are interleaved with the projections 30a, the stop surfaces 111 abut the upper sides of adjacent outer poles and the projections 33,a extend arcuately to engage the axial sides of the adjacent projections 30a. The projections 30a project radially between the projections 33a to form therewith an annular wall spaced radially from but adjacent to the axial side wall 47 of the rotor 42a. The latter is disposed in the receptacle opening in the cup-shaped member 105 and about fills the same.

The cylindrical sleeve 108 also constitutes a portion of the inner field means as it is disposed in the interior bore of the annular coil 11a and is made of a flux conducting metal. The lower end of the sleeve is formed of a reduced diameter of a size to fit snugly in the aperture 107 in the radial wall 106 of the member 108 and an annular shoulder 112 on the sleeve abuts the upper side of the wall 106. The sleeve is telescoped and press-fitted on a cylindrical bearing 113 and its upper end is abutted against the mounting plate 16a thereby completing a flux path from the outer field to the inner field.

The outer wall of the inner sleeve 108 is telescoped in the interior bore 24a of the coil 11a and is of a complementary diameter to hold the same against radial shifting. The coil is held against axial shifting at one end by the wall 106 of the member 105 and at the other end by the mounting plate 16a. The sleeve 105, in turn, alines the member coaxially with the bearing 113 and its bore 114 receiving the rotor shaft 38a.

To accurately aline the bearing 113 and rotor 14a relative to the gear mechanism 15a, an end 116 of the bearing is formed of reduced diameter to fit into a complementary sized opening 118 in the mounting plate 16a and the end of the bearing is swaged over to secure the bearing to the plate. The bearing extends substantially the full length of the sleeve 108 and its bore 114 is sized to receive and journal the rotor shaft 38a for rotation. A pinion 52a is fixed on the upper end of the rotor shaft and is meshed with the gear 54a of the gear mechanism 15a. As in the first described embodiment, an obstructor may be provided to assure rotation of the rotor in the desired direction.

From the foregoing it will be seen that the motor of the present invention may be produced at low cost using a few simple components. The field poles are accurately aligned and positioned relative to one another and to a permanent magnet rotor by being interleaved with one another. The depth of the motor is decreasing by having the rotor inserted within a portion of a central bore of a field coil. The main mounting plate serves the multiple functions of providing field poles, locating and supporting a gear mechanism, and locating and supporting a housing and another set of field poles. Also the motor is assured to turn in the correct direction of rotation due to the action of a novel simple obstructor.

While a preferred embodiment has been shown and described, it will be understood that there is no intent to limit the invention by such a disclosure but rather, it is intended to cover all modifications and alternative constructions falling within the spirit and scope of the invention as defined in the following claims.

What is claimed is:

1. A self-starting, synchronous motor comprising, in combination, an annular coil having a central opening, a permanent magnet rotor disposed to rotate about an axis extending through said opening, means providing outer field poles disposed circumferentially about and radially spaced from said rotor, and means providing inner field poles disposed circumferentially about and radially spaced from said rotor, said inner and outer field poles spaced alternately about the rotor and disposed in engagement with their respectively adjacent poles.

2. The combination of claim 1 in which the outer field pole means includes a series of projections extending radially toward said rotor and spaced circumferentially about the latter and in which the inner pole means includes a series of projections circumferentially spaced about the rotor, said inner pole projections interleaved with and engaged with the outer pole projections.

3. The combination in claim 2 in which the outer field means is a substantially flat plate disposed normal to the axis of rotation of the rotor, and the inner field means is a sleeve disposed coaxially with the axis of rotation of the rotor.

4. A self starting synchronous motor for driving a gear mechanism comprising, the combination of, an annular coil with a central opening, a housing having walls forming a receptacle for receiving said coil, a rotor having a permanent magnet mounted for rotation about an axis through the coil and disposed within the receptacle, a mounting plate for the gear mechanism covering the coil in the receptacle and formed with an aperture coaxial with the axis of the rotor, a set of outer poles formed about the circumference of the aperture in the mounting plate, and a set of inner poles disposed to extend axially and circumferentially of the rotor and related to the outer poles.

5. The combination of claim 4 in which said set of inner poles are formed on one end of a cylindrical sleeve having its other end secured to said housing at one wall of the receptacle, a cylindrical bearing is disposed in said housing for supporting the rotor for rotation with its axis align with the axis of the mounting plate aperture, the diameter of said bearing being less than the diameter of said cylindrical sleeve leaving an annular air space between the bearing and the sleeve.

6. The combination of claim 5 in which said permanent magnet is in the shape of a disc with an outer circumferential wall which is continuous and circular, a first radial wall on said magnet resting on the other end of the cylindrical bearing, a second radial wall on said rotor spaced axially from the first radial wall and disposed substantially coplanar with the outer surfaces of the inner and outer pole projections.

7. The combination of claim 4 in which the permanent magnet is disposed at least partially in the central opening in the coil to reduce the dimension of the motor in the axial direction.

8. A field structure for a synchronous motor with a central rotor and an annular coil, comprising, in combination, a sleeve inserted in a bore of the annular coil with its longitudinal axis aligned with an axis of the rotor, a series of projections spaced circumferentially about one end of the sleeve constituting an inner set of field poles, an outer field means for surrounding the coil and including a plate extending normal to the axis of the sleeve and having an aperture coaxial with the sleeve axis, projections on the plate spaced circumferentially about the aperture and extending radially towards said axis and constituting an outer set of field poles, said pole projections on said sleeve and plate sized for interleaving with and engaging adjacent projections on the other field plate.

9. The combination of claim 8 in which the outer field means includes a dish-shaped housing connected to said plate and having a bottom wall supporting a radial end wall of the coil, said sleeve having its other end fastened to said bottom wall.

10. A field structure for a synchronous motor having an annular field coil with a centrally located rotor, comprising, the combination of, means providing an outer field for the rotor including a series of outer field poles arranged circumferentially about the rotor and disposed in a first plane, a series of alternating spaces and projections extending radially toward the axis of the rotor, and spaced circumferentially about the latter, means providing an inner field for the rotor including a series of inner field poles spaced circumferentially about the rotor and sized to fit into the spaces between said projections and to engage the latter thereby eliminating the air gap between adjacent poles.

11. A direction controlled drive for a clock comprising, in combination, a self-starting synchronous motor having a rotor rotatable in either a forward running direction or a reverse direction, a pinion gear on said rotor for turning in same direction as the rotor, a plurality of spaced shafts, each of said shafts carrying a driven gear and a pinion, the pinions of one shaft driving the driven gear of another shaft to constitute a gear train, one of said driven gears being meshed with the pinion gear on the rotor, an obstructor in the form of a plate having a central aperture fitted over and in frictional engagement with one of said pinions on one of said shafts, an outer free end on said plate spaced radially from said one shaft and movable to a blocking position in which the free end engages the outer periphery of the teeth of a pinion on another of said shafts and blocks the latter from turning in the reverse direction thereby holding the rotor from turning in the reverse direction, and means defining a stop for limiting the turning of the obstructor to an idle position when the rotor is turning in the forward direction.

12. The combination of claim 11 in which the means defining a stop is a portion of one of the gear carrying shafts.

13. The combination of claim 11 in which the other end of the obstructor plate extends diametrically opposite from its mounting shaft and is of the same weight as the blocking end to counterbalance the obstructor for use in different orientations.

14. The combination of claim 11 in which a pair of driven gears are offset axially along their respective shafts by a distance approximately equal to the thickness of the plate, said obstructor being captured in the space between said pair of driven gears and held by the latter against shifting axially along its mounting shaft and from a position for blocking engagement with the pinion gear.

15. The combination of claim 11 in which the blocking end of the obstructor is positioned adjacent to but spaced from the peripheral surface of the gear teeth while the obstructor is in its idle position so that the obstructor moves through only a slight distance to its blocking position.

16. A controlled directional drive comprising, the combination of, a self-starting, synchronous motor having a rotor which begins rotation in either a preferred or opposite direction, a train of gears including one gear driven by said rotor of said motor, and means including an obstructor pivotally mounted for swinging from an idle position when the rotor is running in the preferred direction to a blocking position when the rotor begins to turn in the opposite direction, said obstructor being engaged frictionally by a gear of the gear train to swing by the engaged gear between the idle and blocking positions, said obstructor having a straight, flat wedging surface for wedging against the outer circumferential edges of the teeth of a gear when the obstructor is in its blocking position to stop rotation of the rotor in the opposite direction.

17. The combination comprising, a train of meshed gears each of which is mounted for rotation in a preferred or in an opposite direction, an obstructor means movable from an idle position, in which the gears are free to rotate in the preferred direction, to a blocking position when the gears begin to rotate in the opposite direction, said obstructor means including a relatively flat plate pivotally mounted for swinging movement about a first axis, a surface on said plate in frictional engagement with one of said train of gears for swinging between said positions with movement of said gears, an edge on said plate for engaging the outer peripheral edges of the teeth of a gear mounted on a second axis, the peripheral edges of said gear teeth being spaced from the first axis by a distance less than the radial distance from the first axis to said edge whereby the latter cannot rotate past the edges of the gear teeth and blocks turning of the latter when in engagement therewith, and means for stopping the rotation of said plate to position said plate in its idle position.

18. A self-starting synchronous motor comprising, the combination of, a gear mechanism, a main mounting plate for mounting said gear mechanism in a predetermined location relative to a circular aperture in said mounting plate, a series of projections formed on said mounting plate and spaced circumferentially about the aperture to extend radially toward the center of the aperture, a dish-shaped housing attached to said mounting plate and constituting therewith an outer field for said motor, an annular field coil fitted in said housing and disposed beneath said mounting plate for connection to a source of electricity, a sleeve disposed within the annular field coil and extending axially from the bottom of the housing to the mounting plate, a series of projections formed on the end of a sleeve at said mounting plate, said projections being spaced circumferentially and sized to fit into frictional interlocked engagement with the series of projections on the mounting plate, said sleeve having a bore of a predetermined diameter, a cylindrical bearing of a smaller diameter than the diameter of said sleeve disposed within said sleeve leaving an annular air space about the bearing, a rotor having a permanent magnet journaled in said bearing and disposed axially in said sleeve, the permanent magnet having an outer circumferential wall disposed adjacent to but spaced from the interleaved inner and outer field poles, a pinion gear fixed to said rotor to rotate in the same direction as the rotor, and means including an obstructor plate for pivoting between an idle position in which the gear mechanism and the rotor is adapted to rotate freely in one direction of rotation and to a blocking position in which the obstructor engages the outer peripheral surface of the teeth of a gear to block rotation of the pinion and gear mechanism in a second direction of rotation.

19. A self starting synchronous motor for driving a gear mechanism comprising, the combination of, an annular coil with a central opening, a housing having a radial and an axial wall integrally joined to form a receptacle to receive the coil, a permanent magnet rotor mounted for rotation about an axis through the center of the coil, a mounting plate for the gear mechanism attached to the housing and affording a second radial wall for enclosing the coil in the receptacle, said radial wall of said housing having a circular aperture coaxial with the axis of the rotor, a set of outer pole projections formed about the circumference of the aperture in said housing radial wall, and an inner field means including a sleeve extending through the coil and providing a set of inner pole projections interleaved and engaged with the outer pole projections.

20. The combination of claim 19 in which the sleeve of the inner field means abuts the mounting plate and projects through the bore of the annular coil, and in which the inner field means includes another member having a radial wall with the inner pole projections extending axially and spaced circumferentially about the last-mentioned radial wall, and means on the sleeve for engaging the other member and locating same to aline the inner pole projections coaxially with the axis of the rotor.

21. The combination of claim 19 in which a cover plate is attached to the housing to cover the aperture in the radial housing wall and thereby protect the rotor disposed for rotation in the latter.

References Cited

UNITED STATES PATENTS

| 3,113,231 | 12/1963 | Haydon | 310—163 |
| 3,225,874 | 11/1965 | Woolley | 310—41 |
| 3,308,314 | 3/1967 | Spring | 310—41 |

WARREN E. RAY, Primary Examiner

R. SKUDY, Assistant Examiner

U.S. Cl. X.R.

310—83, 162